Figure 1:
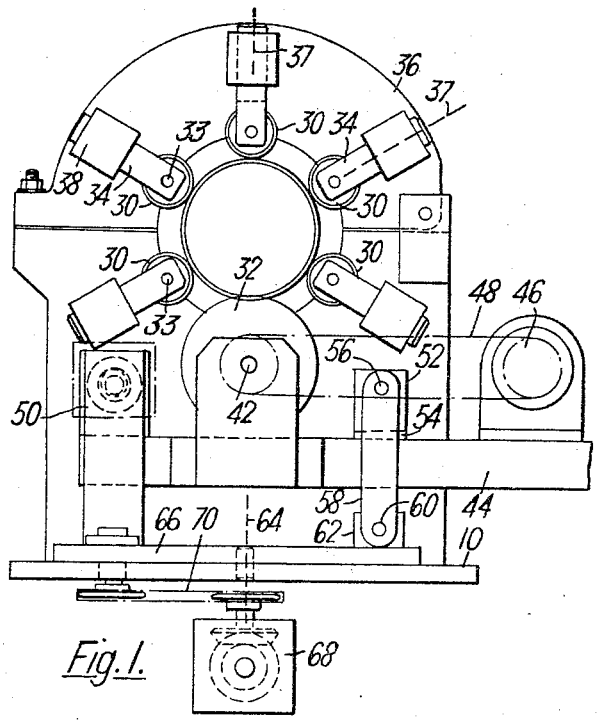

Feb. 27, 1968   R. C. CROSS   3,370,491
METHOD OF AND APPARATUS FOR CUTTING HELICALLY
INCLINED SLOTS IN TUBULAR MEMBERS
Filed March 28, 1966   3 Sheets-Sheet 1

Inventor
ROLAND CLAUDE CROSS

By
Bailey, Stephens & Huettig
Attorneys

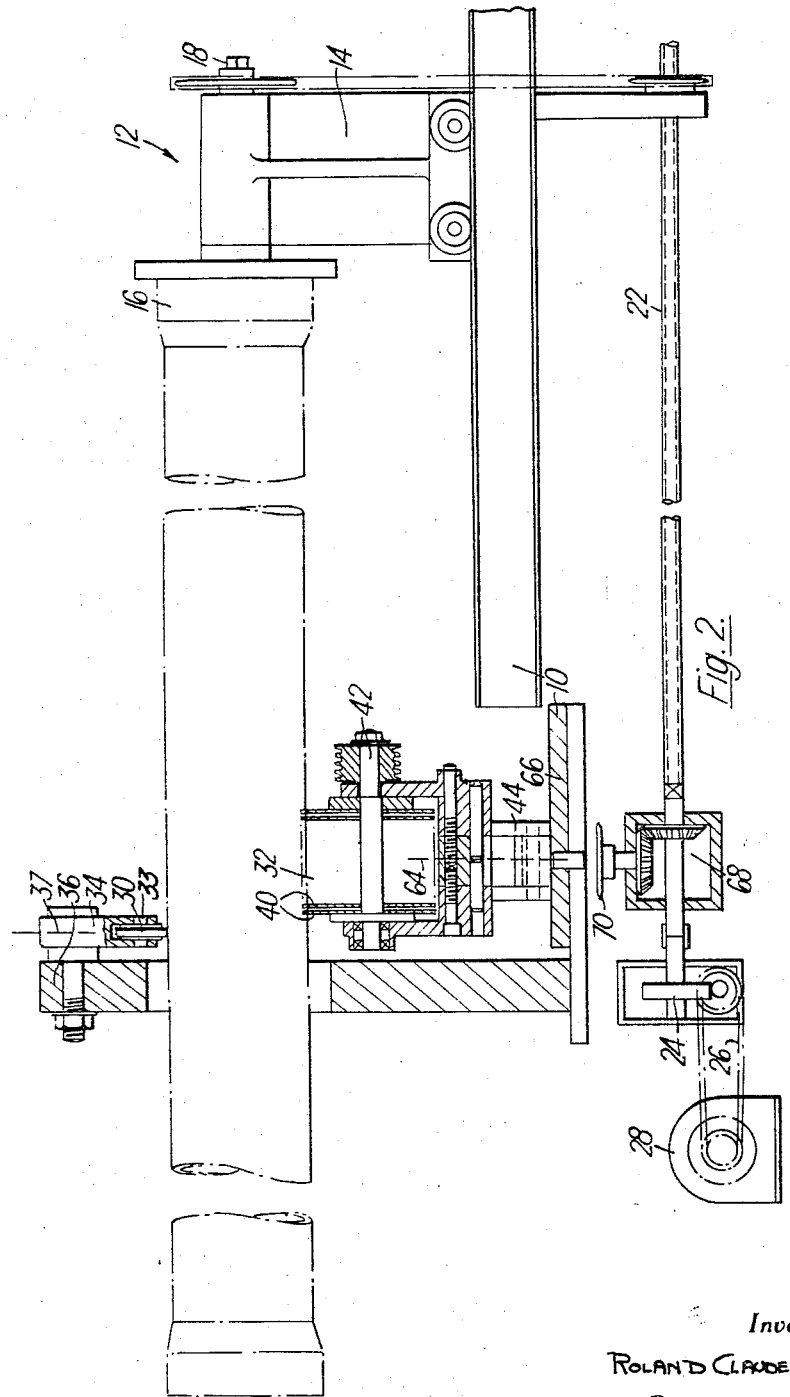

Feb. 27, 1968 R. C. CROSS 3,370,491
METHOD OF AND APPARATUS FOR CUTTING HELICALLY
INCLINED SLOTS IN TUBULAR MEMBERS
Filed March 28, 1966 3 Sheets-Sheet 3

Inventor
Roland Claude Cross
By
Bailey, Stephens + Huettig
Attorneys

3,370,491
METHOD OF AND APPARATUS FOR CUTTING HELICALLY INCLINED SLOTS IN TUBULAR MEMBERS
Ronald Claude Cross, Bath, England, assignor to Bristol Aeroplane Plastics Limited, Bristol, England, a British company
Filed Mar. 28, 1966, Ser. No. 538,031
Claims priority, application Great Britain, Apr. 1, 1965, 13,959/65
17 Claims. (Cl. 83—37)

This invention is concerned with a machine for cutting slots in tubes, and in particular for cutting them to lie at a predetermined angle to the tube axis. It is also capable of cutting them so that rows of parallel and adjacent slots extend helically around the tube, the helix angle being perpendicular to each slot. Furthermore it may produce a series of these helices, lying parallel to and equally spaced from one another around the tube and the cutting of the slots in a tube can be carried out continuously along any desired length of the tube.

This is of particular use when it is required to produce uniform slots in a tube made of synthetic resin reinforced with helically wound glass fibre rovings, wherein the strands of glass lie at particular helical angles. Usually the tube is formed of successive layers of glass fibre rovings which are parallel to one another in any layer, but successive layers are preferably wound in opposite helical directions. The pitches of the helices of various layers may differ; for example, the pitch of the layers of rovings which are intended to give mainly longitudinal strength may be relatively long and the pitch of layers giving mainly hoop strength may be relatively short.

It is desirable to arrange that any series of slots cut in such a tube are so aligned that severance of the glass threads in the layers thereof on which the hoop strength of the tube depends is mainly avoided.

A machine according to this invention comprises in combination a means for supporting a tube, a means for rotating the tube about its longitudinal axis and a means for simultaneously moving the tube along the axis so that each point on the tube wall will be moved in a helical path of predetermined pitch about the axis, a slot cutting means movably mounted with respect to the tube supporting means so as to be moved cyclically towards and away from the tube wall and in a reciprocating manner along a path conforming substantially to the helical path of those points on the tube engaged by the cutting means, the means for cyclically moving the cutting means being operatively coupled to the tube rotating means in a manner which ensures a complete slot-cutting cycle for each of successive predetermined angles of rotational movement of the tube rotating means.

According to another feature of the invention a method for cutting a continuous series of slots of substantially uniform length in the walls of the tube, comprises supporting the tube, rotating the tube, moving the tube axially, and cutting slots therein; the three actions being coordinated in such a manner that each element of the tube has as its locus a first helix, the axis of which helix coincides with that of the tube, the plane of the cutting action being arranged to contain the direction of movement of those elements of the tube which it engages when cutting, the cutting action moving when viewed along a tangent to the tube lying in that plane, in an oscillatory fashion along a line passing perpendicularly through the axis of the tube, the frequecy of the oscillation being related to the rate of movement of the tube, such that at least one series of slots is cut in the tube wall, the centres of which slots lie on a second helix which extends transversely to the first helix, the distance between the centres of adjacent portions of the slots, and each of the slots lying parallel to and substantially in line with a slot in the said adjacent portion, the distance between two adjacent slots, measured along a second helix being substantially uniform.

Figure 4:
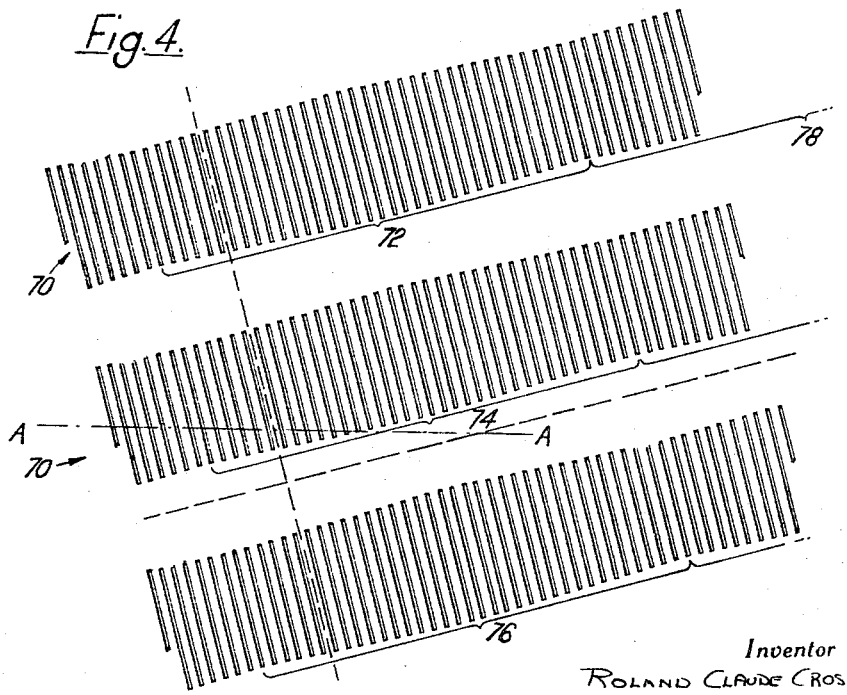
Figure 3:
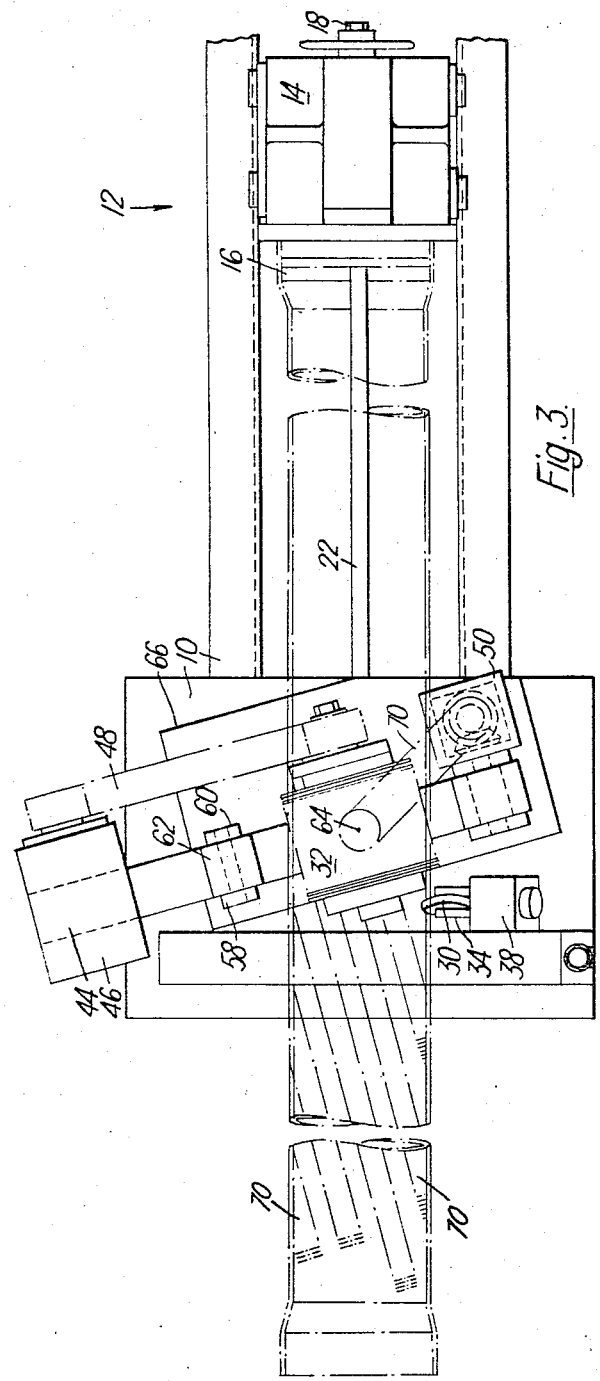

One machine embodying the invention is described below with reference to the accompanying drawings in which:

FIGURE 1 is an end elevation of the machine;
FIGURE 2 is a side elevation;
FIGURE 3 is a plan; and
FIGURE 4 is a development of part of the surface of a tube having one arrangement of slots cut by this machine.

The machine comprises a main frame or bed 10 upon which the various intercoupled mechanisms are mounted; the means for rotating the tube is constituted by a compressible rubber chucking arrangement 12 held in bearings in a carriage 14 which is free to move in the direction of the tube's axis, on the main bed. The chuck serves to support one end 16 of the tube, and impart rotary motion to it. The spindle 18 of the chuck extends from the bearing and has a sprocket mounted on it. This sprocket is connected through an endless chain to a sprocket mounted to rotate with but move in splines along a layshaft 22 which connects through a worm gear 24 and a belt and pulley 26 to a main driving motor 28. At least one of the sprockets may be made interchangeable to make the drive one of variable speed. The sprocket on the layshaft is journalled in a bracket depending from the carriage 14.

The free end of the tube is supported by five rubber rollers 30, mounted on a rigid yoke surrounding another portion of the tube and attached to the main bed. These five rollers constitute part of the means for moving the tube axially. When viewed axially, they lie at five points of a hexagon around the tube; at the sixth point, which is the bottom one, is the cutting means 32, which is described below. The rollers are relatively narrow (e.g. ½" wide) and have rubber tires; their axes of rotation 33 lie in the general direction of the tube axis, but their exact alignment is finely adjustable, for purposes described below. A forked member 34 supporting each roller, and carrying the bearing therefor, is mounted in a yoke 36 and is rotatable about a second axis 37 perpendicular to the tube axis by virtue of a cylindrical stem of the forked member being rotatably supported in a bearing member 38 bolted rigidly to the yoke 36. Each forked member is also adjustable along its respective second axis 37, so that tubes of various diameters can be properly located by the same rollers. Provision is made for each roller to be adjusted, and then rigidly locked in place, both along and about its respective axis 37.

Each roller can therefore be angularly adjusted about the axis 37 so that its axis of rotation 33 lies oblique to the tube axis. The oblique alignment of the axes of the rollers relative to the tube axis will cause the tube to be drawn through the yoke in a helical manner as it is rotated. If it is found that the frictional engagement between the rollers and the tube surface is not sufficient to achieve this, which movement also involves the movement of the carriage 14 along the bed 10, and of the lower chain wheel along the layshaft 22, then the axial movement of the tube could alternatively be achieved by positive axial shifting of the carriage 14, by means driven by the rotation of the layshaft 22.

The cutting means 32 is constituted by a number of circular cutting discs 40 of equal diameter mounted on a common driving spindle 42. The spindle is rotatably mounted in bearings arranged transversely to and carried by a horizontal beam 44 mounted on the machine bed so as to extend across and beneath the tube. One end of this beam carries a motor 46 to drive the cutting discs, the power being transmitted thereto by a belt and pulley arrangement 48. The other end of the beam carries an eccentric 50 which is described below. The beam is supported on the machine bed 10 at a point between the cutter spindle and the motor. A block 52 is bolted to the upper surface of this portion of the beam, being spaced therefrom by a number of spacing pieces 54. Through the block and transverse to the beam extends a pivot 56 which engages in bearings in two vertical rigid links 58 lying on opposite sides of the beam 44. These links are pivoted at 60 about their lower end to a support 62 on the machine bed, this last pivot lying parallel to the upper one, but beneath the beam and being supported in a bearing mounted on a plate 66, described below. The beam is therefore able to swing longitudinally about the two pivots.

When circular motion is imparted to the beam by the aforesaid eccentric 50, the axis of which motion is horizontal and transverse to the beam, the total horizontal component of the motion is therefore imparted to the cutters, but only a part of the vertical motion, the proportion being evident from a consideration of lever arms about the beam's pivots.

The plate 66 carrying the lower pivots of the beam is itself pivoted about a vertical axis 64 extending through the centre point of the length of the cutter spindle, the axis of the said spindle and the axis of the tube. By rotating the plate 66 about this axis 64, the blades 40 of the cutter can be aligned to suit considerations explained below.

The angle of the helical movement of the tube is determined, in the machine described, by the angle at which the axis of each roller is inclined to the axis of the tube. As the cutting means in this embodiment has the form of a rotating circular disc, the axis of rotation of this disc lies perpendicular to the plane of cut of the disc, and thereby to the length of each slot. The paths of the rollers on the tube, since they determine the helical movement of the tube, must be parallel to the slots for a clean cutting action to be achieved. It follows therefore that the angle of inclination of the axis 42 of the cutting means to the tube axis must be equal to the angle of inclination of the axis of rotation of each roller to the tube axis, the angles being viewed along the axes 64 and 37 respectively.

In the embodiment described, the cutting means comprises a plurality of coaxial cutting discs. It is convenient, when cutting slots in a tube of the type described below, in which it is required to maintain one or more helical portions of the tube in an unsevered condition, and which portions may be of opposite hand, to have successive "blocks" of slots, each block being cut in one cycle of the cutting means, to lie end to end and extend helically around the tube in a direction transverse to the length of the slots. This is readily achieved in this arrangement by suitably arranging the synchronisation of the cutting means, driven by the eccentric, with the rotation of the tube, so that a block of slots is cut for successive predetermined angles of rotation of the tube. These angles can clearly be made substantially less or a little more than a single rotation of the tube, so that one or more helices may be cut. The line joining the centres of adjacent slots will be perpendicular to the lengths of the slots. By arranging the number and spacing of the cutting discs to match the pitch of the helix determined by the rollers, the adjacent slots of adjacent groups in a helix will be spaced apart by the same amount as the slots within a group.

In alternative arrangements, for example, a single cutting disc may be used, or non-coaxial discs. In such cases the lengths of the slots may not be perpendicular to the slots, but the two directions are preferably generally transverse to each other. Considering the means for synchronising the motions involved, it is preferable to have the lengths of the slots inclined to the axis of the tube at an angle lying in the range 45°–90°, and the line joining the centres of adjacent slots inclined to the tube axis at an angle of between 0° and 45°.

The eccentric 50 derives its power from the main drive motor 28, through a pair of bevel gears 68, a first wheel of which is mounted on the layshaft 22; the second wheel has its pivot in line with the shaft 64 and is connected through a chain drive 70 to the eccentric 50, which by means of the usual eccentric sheave translates the circular motion into eccentric, which in turn causes elliptical motion of the cutters in a plane parallel to them by virtue of the beam's ability to swing longitudinally, yet pivot about either of its pivots at the same time.

The cutting discs are located so that when they are passing through the upper arc of their elliptical path they cut through the tube wall, the extent by which they penetrate through the wall being adjustable by adjusting the beam vertically in its support, by adding or removing spacing pieces 54.

With the mechanisms described the ends of the slots will extend inwards substantially normally to the tube wall. This can only be achieved by having the cutting means to move bodily in the same sense as the adjacent part of the tube when it is cutting the slots. This alone, however, is not sufficient to achieve total normality. Other significant factors are the diameter of the cutter, the diameter of the tube, the speed of the elliptical movement in relation to the movement of the tube; one factor which prevents total normality from being achieved is the presence of a pivot at the centre of the cutter about which the cutter rotates.

A tube for which the machine is particularly suitable is disclosed in U.S. patent application No. 481,271.

Briefly, the pipe is formed by six layers of resin-impregnated glass fibre. The first layer is wound on at an angle of 75°, and the following layers are respectively wound on at angles of −22.5°, +22.5°, −22.5°, +75° and 22.5°. In this case the hoop strength of the pipe is derived mainly from the two layers wound on at 75°, and the slots lie parallel to these two layers.

The slots lie in a number of helical rows 70, the line joining the centres of the slots in each row being at right angles to the slots.

The slots are shown at an angle of 75° to the axis A—A of the pipe. In this example there would be 8 helical rows of slots evenly spaced around the pipe.

The slots lie in groups; for example, one group 72 is identified in the top row, and corresponding groups 74 and 76 are identified in the middle and bottom rows shown in FIGURE 4. The length of the slots decreases towards each end of each group, the average length being 1.83″. The slots within each row are at a pitch of 0.187″ and the width of each slot is 0.05″; the pipe is 8 inches in diameter.

The varying length of the slots arises out of the way in which the slots are machined. The cutting means comprises 36 axially spaced cutting discs of equal diameter. Each disc cuts one of the slots in each group of 36 slots. The cutting discs are fed into the tube as evenly as possible, with the result that the discs towards the middle bite further into the tube owing to the curvature of the wall of the tube.

When the machine is operating on the tube, the tube is moved axially and rotated about its axis while the cutter is fed intermittently into the tube so as to form a part of each of the eight rows of slots during each revolution of the tube. If, for example, the movement of the tube with respect to the cutter is upwards, the speeds of rotation and axial translation of the tube are such that the cutter forms firstly the group 72 of the slots in the first row, and when the cutter makes its next plunge into the tube, the group 74 of slots in the next adjacent row is machined, and at the next plunge of the cutter the group 76 is machined, and so on. The eighth plunge of the cutter following the plunge which forms the group 16 results in the formation of a group 78 which forms a continuation of the row containing the group 72; it will be appreciated that the axial and rotational movements of the tube are accurately related in order to achieve this.

I claim:

1. A machine comprising in combination, a means for supporting a tube, a means for rotating the tube about its longitudinal axis and a means for simultaneously moving the tube along the axis so that each point on the tube wall will be moved in a helical path of predetermined pitch about the axis, a slot cutting means movably mounted with respect to the tube supporting means so as to be moved cyclically towards and away from the tube wall and in a reciprocating manner along a path conforming substantially to the helical path of those points on the tube engaged by the cutting means, the means for cyclically moving the cutting means being operatively coupled to the tube rotating means in a manner which ensures a complete slot-cutting cycle for each of successive predetermined angles of rotational movement of the tube rotating means.

2. A machine as claimed in claim 1 in which the coupling of the rotating means, the axial moving means and the cutting means is so arranged that the line joining the centres of adjacent slots cut in a tube extends transversely to the direction of cut of the slots.

3. A machine according to claim 1, in which the alignment of the cutting means in relation to the axis of the tube is such that the direction of cut of the slots lies inclined at an angle of between 45° and 90° to the axis of the tube, and the direction of the line joining the centres of slots lies inclined at an angle of between 0° and 45° to the axis of the tube.

4. A machine according to claim 1, in which the cutting means, when acting on the tube moves bodily in the same sense as the adjacent part of the tube.

5. A machine according to claim 1 in which the means for rotating the tube is constituted by a rubber spigot for pressing into a free end of the tube, the spigot being supported in bearings in a tailstock and having a rigidly attached spindle extending away from the tube, which spindle is mounted to be rotated by a driving motor.

6. A machine according to claim 1, in which the means for moving the tube axially is constituted by rollers which frictionally engage the tube, the axis of each roller lying in a plane parallel to that plane which is tangential to the tube at the point of contact of the roller, but each axis when viewed in the direction perpendicular to these planes, being inclined to the axis of the tube at an angle equal to the angle at which the length of a slot is inclined to the axis of the tube, and the means for rotating the tube being freely movable in the direction of the tube axis.

7. A machine according to claim 1, in which the means for cutting a slot in the tube wall is constituted by a rotatable circular disc-type blade.

8. A machine according to claim 7 in which the cutting means comprises two or more such disc type cutting blades, carried on a common driving spindle but spaced apart from each other by spacing members.

9. A machine according to claim 1, in which the oscillatory action of the cutting means is achieved by having the cutting means mounted to rock about a pivot which is perpendicular to its cutting directions and to be further acted on by an eccentric the arrangement being such that when the cutting means is caused by the eccentric to rock about the said pivot, it cuts the tube wall during a part of its oscillatory path.

10. A machine according to claim 1 in which the means for rotating the tube is linked by a gear system to the oscillatory cutting means, both being driven by the same motor, there being provisions for varying the ratio of their relative speeds.

11. A machine according to claim 6 having a headstock which supports rollers, each roller being rotatably adjustable about a pivot perpendicular to and passing through the tube axis, so that the ratio of the rotational speed to the axial speed of the tube may be varied, and each roller being further adjustable along the pivot so that tubes of different diameters may be accommodated.

12. A machine according to claim 6 in which there are five rollers, being arranged such that when viewed along the axis of the tube, their points of contact with the tube, and that of the cutting means with the tube, are distributed around the axis so as to lie on one of the corners of a regular hexagon.

13. A machine according to claim 9 in which the eccentric, and the cutting means are mounted on a beam which is pivoted to a link, the link being further pivoted to a rigid pin, the pin preferably being adjustable as an eccentric to give a fine setting for cutter depth of slot; the pivots being parallel to each other and on the same side as and transverse to the beam, the cutting means being mounted between the eccentric and the pivots.

14. A machine according to claim 13 in which the beam further supports a motor for operating the cutting means.

15. A machine according to claim 13 in which the beam may be rotatably adjusted about a pivot, the axis of which is perpendicular to the length of the beam, and extends through the cutting means, and also extends through and is perpendicular to the axis of the tube.

16. A machine according to claim 15 in which the drive from a main motor passes through a worm gear and to a layshaft which drives the rubber spigot; the layshaft further having a bevel gear which mates with a gear coaxial with the pivot about which the beam may be rotated, there being further a chain wheel coaxial with this pivot, which is associated by an endless chain to other wheels on the beam for driving the eccentric.

17. A method for cutting a continuous series of slots of substantially uniform length in the walls of a tube, comprising supporting the tube, rotating the tube, moving the tube axially, and cutting slots therein; the three actions being coordinated in such a manner each element of the tube has as its locus a first helix, the axis of which helix coincides with that of the tube, the plane of the cutting action being arranged to contain the direction of movement of those elements of the tube which it engages when cutting, the cutting action moving when viewed along a tangent to the tube lying in that plane, in an oscillatory fashion along a line passing perpendicularly through the axis of the tube, the frequency of that oscillation being related to the rate of movement of the tube, such that at least one series of slots is cut in the tube wall, the centres of which slots lie on a second helix which extends transversely to the first helix, the distance between the centres of adjacent portions of the second helix or helices, measured along a first helix, being greater than the general length of the slots, and each of the slots lying parallel to and substantially in line with a slot in the said adjacent portion, the distance between two adjacent slots, measured along a second helix being substantially uniform.

References Cited

UNITED STATES PATENTS 2,185,337   1/1940   Green.
3,209,632  10/1965   Reising _____ 83—310

ANDREW R. JUHASZ, *Primary Examiner.*